United States Patent [19]
Stouffer

[11] Patent Number: 5,543,778
[45] Date of Patent: Aug. 6, 1996

[54] SECURITY SYSTEM

[75] Inventor: Peter J. Stouffer, Clarkston, Mich.

[73] Assignee: Code-Alarm, Inc., Madison Heights, Mich.

[21] Appl. No.: 49,464

[22] Filed: Apr. 19, 1993

[51] Int. Cl.$^6$ .............................. G08B 1/08; B60R 25/10
[52] U.S. Cl. .................. 340/539; 340/531; 340/425.5; 340/426; 340/506
[58] Field of Search .................................... 340/539, 531, 340/506, 825.44, 425.5, 426, 429, 430; 365/189.01, 185.3, 189.09; 257/316, 317, 314, 322, 3

[56] References Cited

U.S. PATENT DOCUMENTS

| | | | |
|---|---|---|---|
| 3,337,992 | 8/1967 | Tolson | 340/825.69 |
| 3,833,895 | 9/1974 | Fecteau | 340/505 |
| 3,925,763 | 12/1975 | Wadhwani et al. | 340/505 |
| 3,953,769 | 4/1978 | Sopko | 340/825.31 |
| 4,021,796 | 5/1977 | Fawcett, Jr. et al. | 340/500 |
| 4,327,353 | 4/1982 | Beard et al. | 340/543 |
| 4,353,058 | 10/1982 | Sacks | 340/870.21 |
| 4,523,184 | 6/1985 | Abel | 340/531 |
| 4,631,527 | 12/1986 | De Witt et al. | 340/539 |
| 4,641,127 | 2/1987 | Hogan et al. | 340/539 |
| 4,737,770 | 4/1988 | Brunius et al. | 340/539 |
| 4,771,399 | 9/1988 | Snowden et al. | 340/825.44 |
| 4,772,876 | 9/1988 | Laud | 340/539 |
| 4,821,027 | 4/1989 | Mallory et al. | 340/539 |
| 4,857,912 | 8/1989 | Everett, Jr. et al. | 340/522 |
| 4,952,928 | 8/1990 | Carroll et al. | 340/539 |
| 5,055,851 | 10/1991 | Sheffer | 340/539 |
| 5,296,716 | 3/1994 | Ovshinsky et al. | 257/3 |

*Primary Examiner*—Donnie L. Crosland
*Attorney, Agent, or Firm*—John G. Chupa

[57] ABSTRACT

A home security system includes a plurality of alarm elements; a central console including a microprocessor in wireless communication with the alarm elements and effective to receive a signal from the alarm elements; an automobile including an alarm system in wireless communication with the central console's microprocessor and effective to activate certain alarm elements when the automobile's alarm system is in close proximity to the home security system and when the automobile is started; the microprocessor being connected to a tri-state analog to digital convertor which includes a plurality of resistors whose resistance values cooperatively determined an accuracy of analog to digital conversion with respect to the received signal transmitted from the alarm elements. An EEPROM that includes gray scale conversion is also realized.

1 Claim, 8 Drawing Sheets

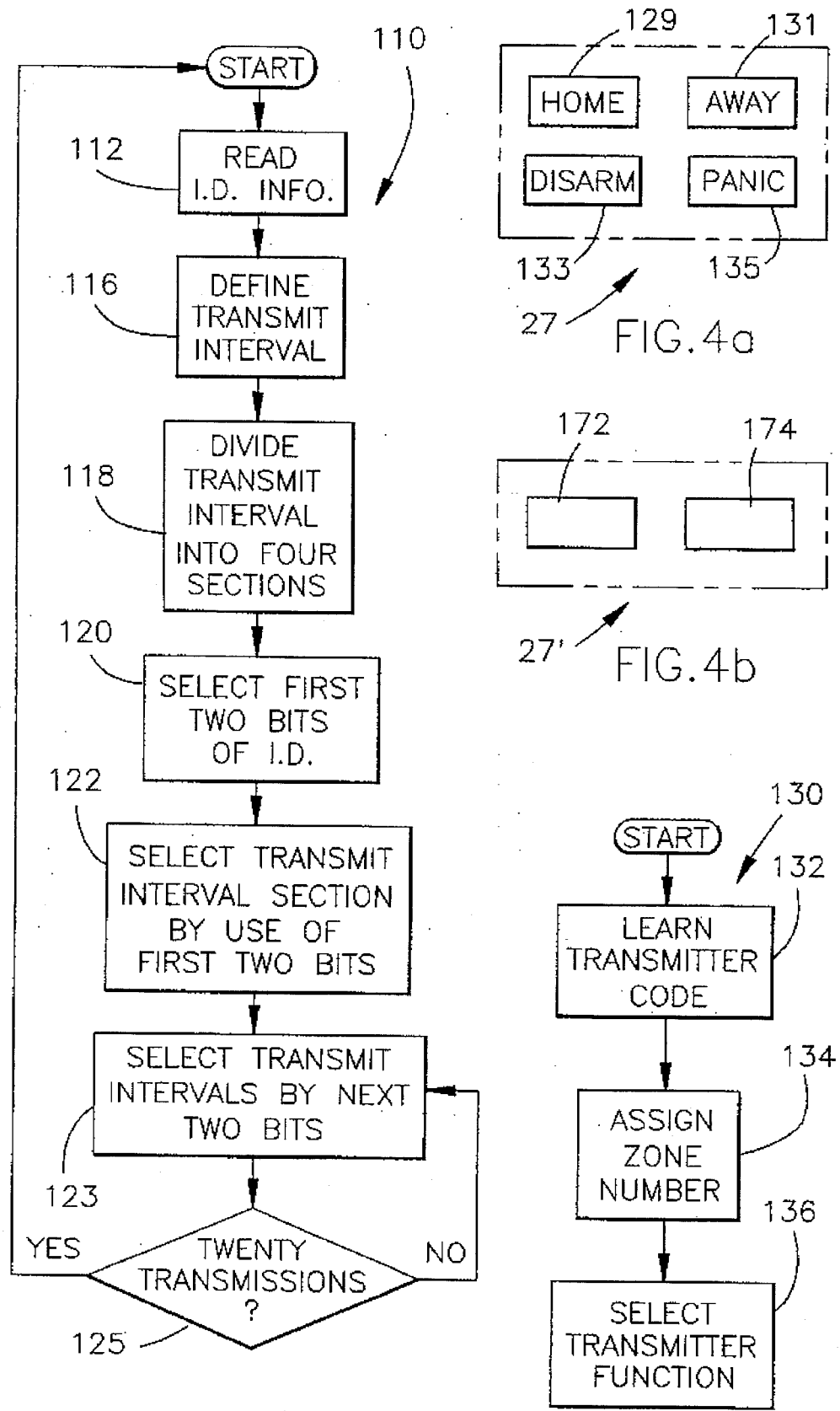

| | TRANSMITTER TYPE | TRIP IN HOME MODE | TRIP IN AWAY MODE | TRIP IN DISARM MODE | DAY CHIRP[1] | CANCEL FROM CONSOLE | SIREN SOUNDS |
|---|---|---|---|---|---|---|---|
| 152 | | | | | | | |
| 154 | DW INSTANT | √ | √ | | √ | | √ |
| 156 | DW DELAY | √ | √ | | √ | | √[2] |
| 158 | PIR | | √ | | | | √ |
| 160 | PANIC | √ | √ | √ | | √ | √[3] |
| 162 | MEDICAL | √ | √ | √ | | √ | √[4] |
| 164 | SMOKE | √ | √ | √ | | √ | √[5] |
| 166 | HEAT | √ | √ | √ | | √ | √[5] |
| 168 | GLASS BREAK | √ | √ | | | | √ |
| 170 | UTILITY | √ | √ | √ | | | |
| | INTERIOR | | √ | | | | √ |

FIG. 6

| | TYPE | | | |
|---|---|---|---|---|
| 182 | ARM/DISARM | ARM IN HOME MODE ON FIRST PRESS. ARM IN AWAY MODE ON NEXT PRESS | DISARM | PANIC |
| 184 | ARM HOME ONLY | ARM IN HOME MODE | DISARM | PANIC |
| 186 | ARM AWAY ONLY | ARM IN AWAY MODE | DISARM | PANIC |

FIG. 7

| | TRANSMITTER TYPE | LEFT BUTTON | RIGHT BUTTON | BOTH BUTTONS |
|---|---|---|---|---|
| 188 | ARM/DISARM | ARM IN HOME MODE ON FIRST PRESS. ARM IN AWAY MODE ON NEXT PRESS. DISARM ON NEXT PRESS. | −NOT USED− CAN BE USED TO ARM & DISARM VEHICLE ALARM | PANIC |
| 190 | ARM HOME ONLY | ARM IN AWAY MODE ON FIRST PRESS. DISARM ON NEXT PRESS. | −NOT USED− CAN BE USED TO ARM & DISARM VEHICLE ALARM | PANIC |
| 192 | ARM AWAY ONLY | ARM IN AWAY MODE ON FIRST PRESS. DISARM ON NEXT PRESS. | −NOT USED− CAN BE USED TO ARM & DISARM VEHICLE ALARM | PANIC |

FIG.8

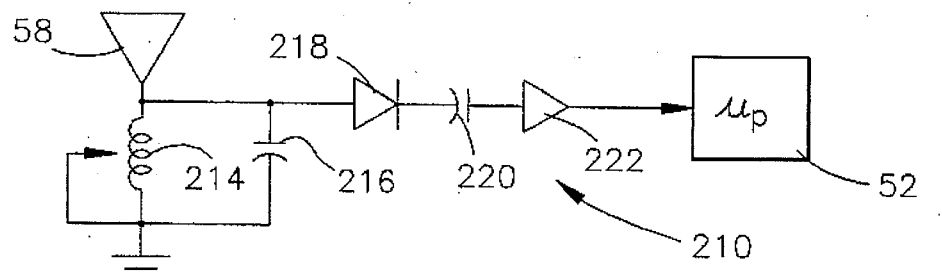

FIG.9

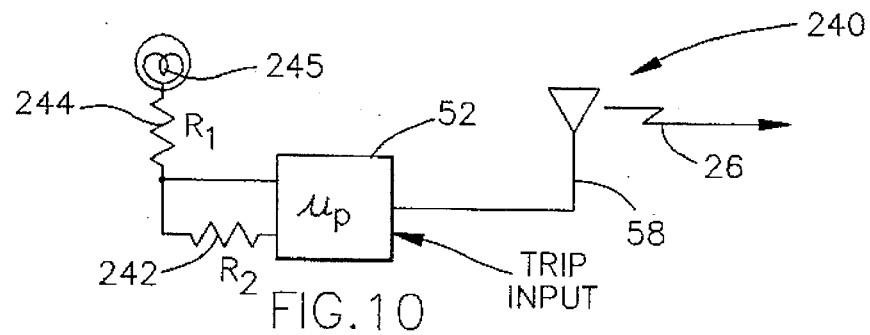

FIG.10

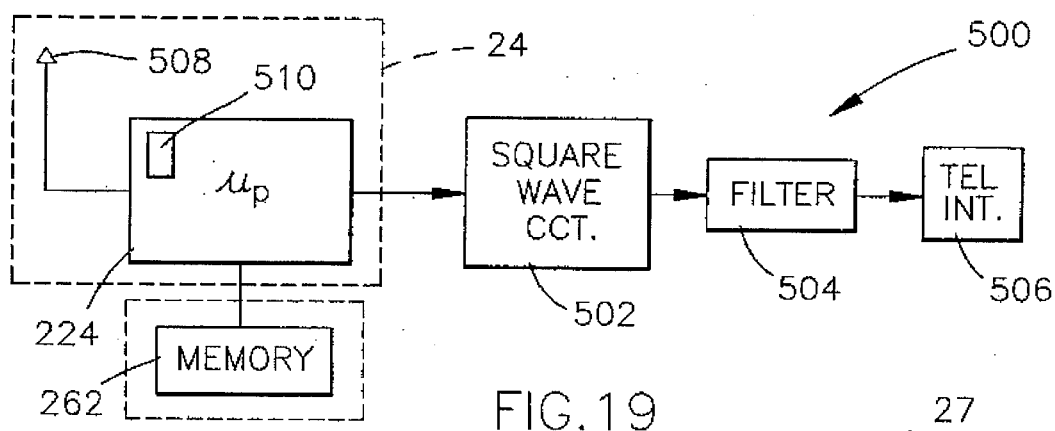
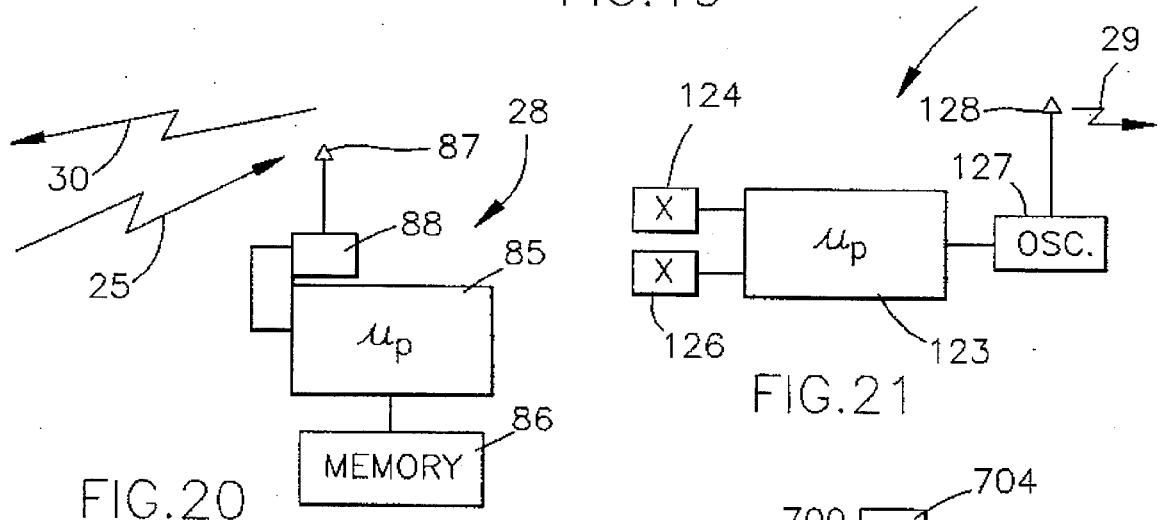
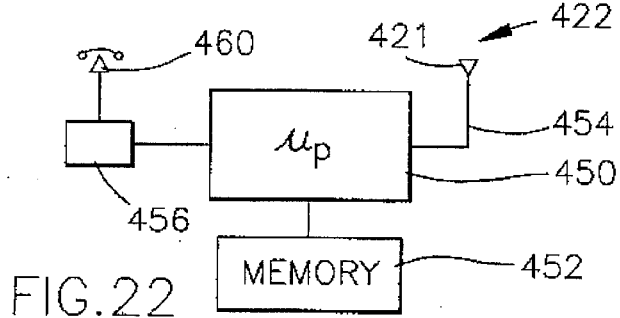
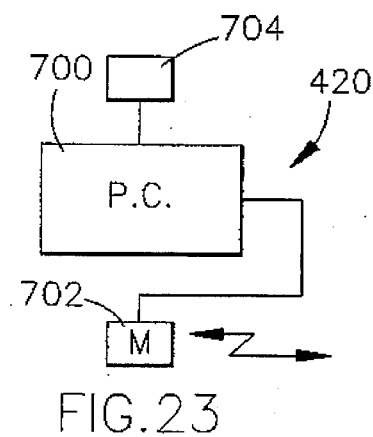
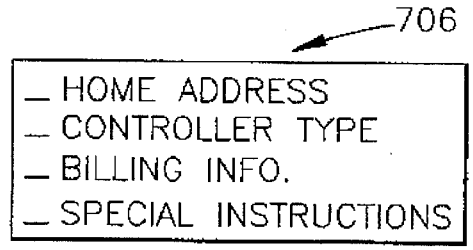
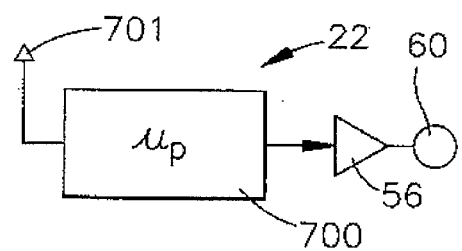

5,543,778

SECURITY SYSTEM

FIELD OF THE INVENTION

This invention relates to a security system and more particularly to a security system having security components which wirelessly communicate and which may be adapted for use in a home or other building or structure.

BACKGROUND OF THE INVENTION

Security systems are normally deployed in homes and in other areas to prevent theft, damage, and injury to residents within the homes. More particularly, these systems include various alarm components or elements which are physically connected (e.g. by wire) to a central console. These elements generate an electrical signal upon the occurrence of an event such as the opening of a door or window or the presence of pressure upon a window or other portion of the house. Upon receipt of these signals, the central console typically activates a siren to "warn away" potential intruders and further communicates an alarm signal to a central monitoring station, effective to allow the central monitoring station to notify the police or other local authorities of the presence of an "alarm condition".

While these prior security systems have been somewhat effective, they are rather difficult and costly to install since they require that each of the separate components be connected to the central console by a separate and unique wire. The placement of this large amount of wire is especially difficult in pre-existing homes and other structures and, in many cases, is run on the outside of the walls providing a very unaesthetically pleasing appearance.

Moreover, in uncompleted homes or other structures the wire is normally installed prior to the drywall or plaster which forms the house or structure walls. In this manner, the installed drywall covers the wire. Since the wire is embedded with the drywall it is very difficult to ascertain and correct wire faults. Even after correctly determining the various wire faults, correction necessitates puncturing and/ or cutting the walls. After wire installation is completed the cut walls must be later repaired, thereby increasing cost and providing an unsightly appearance. Moreover, should it be necessary to modify the security system (i.e. by adding elements) the drywall or plaster must again be cut or broken unless the new wires are placed on the outside of the walls.

There is therefore a need to provide a security system having various security components which communicate to a central console in a wireless manner and which may be added to an existing wire-based security system, effective to provide additional functionality to the existing system. Moreover, there is a further need to allow this system to be placed in a dwelling/home as well as in other types of structures.

SUMMARY OF THE INVENTION

According to one aspect of the present invention a home security system is provided.

According to a second aspect of the present invention a home security system is provided including an alarm activation element and a console in wireless communication with the element. The console is adapted to provide an alarm output signal upon receipt of a signal from the alarm activation element.

According to a third aspect of the present invention a home security system is provided having several alarm activation elements; a siren; and a central console In wireless communication with the siren and the alarm elements and adapted to activate the siren upon receipt of a signal from the alarm elements.

These and other features, objects, and advantages of the present invention will become apparent from a reading of the following detailed description of the preferred embodiment of the invention and by reference to the claims when taken in combination with the accompanying drawings.

BRIEF DESCRIPTION OF THE DRAWINGS

FIG. 3 is a flowchart illustrating the sequence of steps associated with the selection of a transmit time interval for each of the alarm activation elements shown in FIG. 1;

FIGS. 4a and 4b are top views of the control transmitter shown in FIG. 1 and respectively made in accordance with a first and second transmitter embodiment of this invention;

FIG. 5 is a flowchart illustrating the sequence of steps associated with the "teaching" of each of the alarm elements shown in FIG. 1 to a central console controller;

FIG. 6 is a table illustrating the various types of alarm elements used by the security system of the preferred embodiment of this invention;

FIG. 7 is a table illustrating the various switch depression functions associated with the transmitter embodiment shown in FIG. 4(b);

FIG. 8 is a table illustrating the various switch depression functions associated with the transmitter embodiment shown in FIG. 4(b);

FIG. 9 is an electrical schematic diagram of a signal detector made in accordance with the teachings of a preferred embodiment of this invention;

FIG. 10 is a block diagram of a low battery detect circuit used in combination with the alarm elements shown in FIG. 1;

FIG. 19 is a block diagram of the console shown in FIG. 1 and including a telephone interface portion;

FIG. 20 is a block diagram of the repeater shown in FIG. 1;

FIG. 21 is an electrical schematic diagram of the transmitters shown in FIGS. 4(a–b);

FIG. 22 is a block diagram of a telephone receiver interface unit made in accordance with the teachings of the preferred embodiment of this invention;

FIG. 23 is a block diagram of the central alarm receiver shown in FIG. 5;

FIG. 24 is an illustration of a typical record used by the central alarm receiver shown in FIG. 23;

FIG. 25 is a block diagram of a siren;

DETAILED DESCRIPTION OF THE PREFERRED EMBODIMENT

Figure 1:
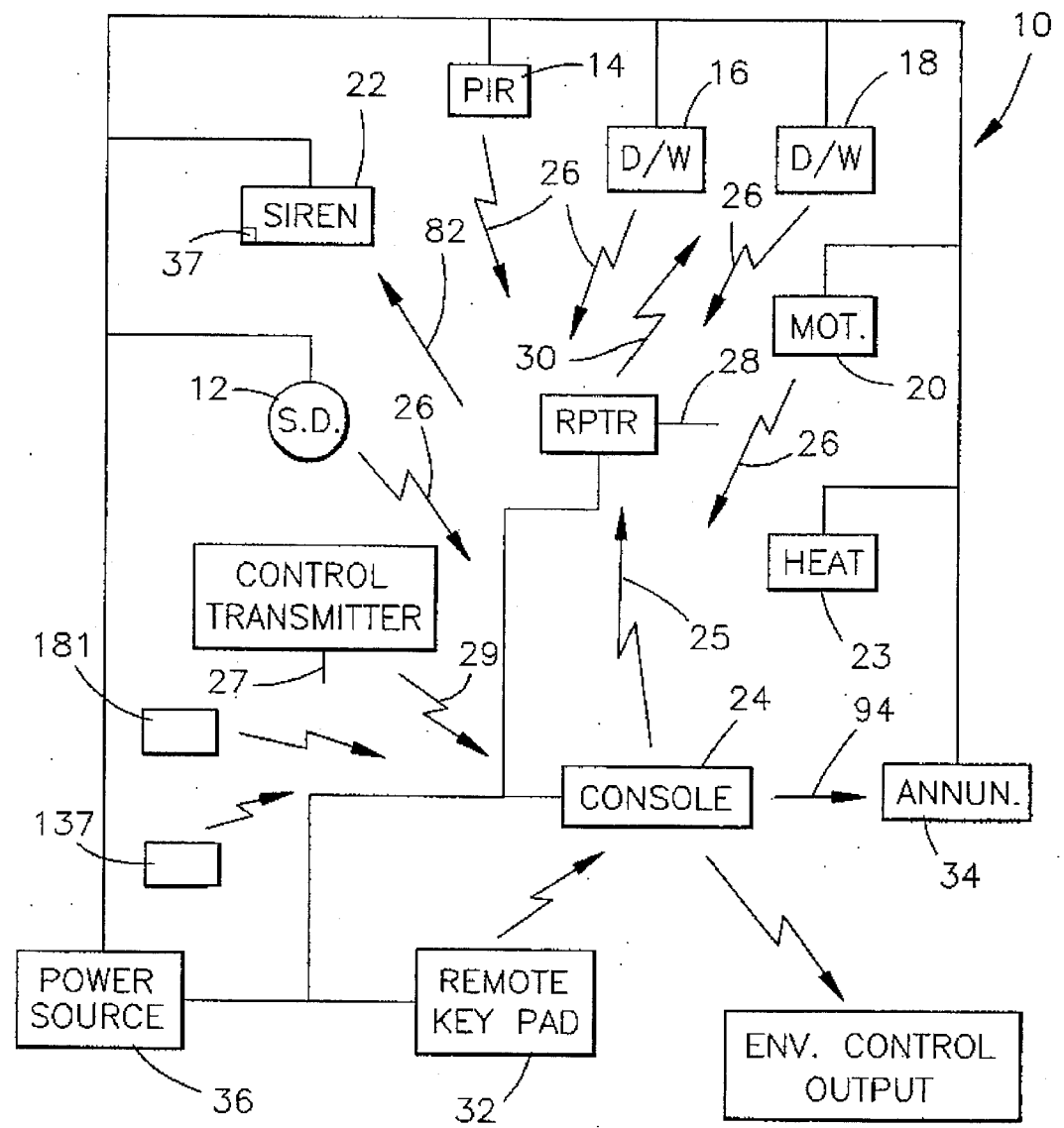
FIG. 1 is a block diagram of a security system made in accordance with the teachings of a preferred embodiment of this invention.

Referring now to FIG. 1, there is shown a security system 10 made in accordance with the teachings of the preferred embodiment of this invention and adapted for use in a home, residence, or other structure.

As shown, system 10 includes several alarm activation elements such as a smoke detector 12, passive infrared element 14, door/window element 16, 18, motion detection element 20, siren 22, and a heat sensor 23 which are wirelessly, electrically, and communicatively coupled to a central console controller 24. As will be shown, such coupling may be achieved by the use of electromagnetic radiation having a frequency in the radio, infrared, ultrasonic, ultraviolet, or any other desirable range. Moreover, such wireless communicative coupling is achieved by the selective generation of signals 26 from elements 12–23 and by the selective generation of signals 25, 82 from console 24.

System 10 also includes a repeater 28 which is adapted to receive one of the signals 26 from console 24 and each of the elements 12–23 and to produce a signal 30 or 31 having substantially the same data structure as the received signal. The use of repeater 28 increases the allowable communication distance between console 24 and elements 12–23 and allows for desirable and controlled operation even though many physical obstructions may lie between elements 12–23 and console 24. Lastly, as further shown in FIG. 1, system 10 includes a remote keypad 32, transmitter 27, and an annunciator 34, each of which will be described. Each of the elements 12–23 and console 24 may be coupled to a source of electrical power 36, or may each have a portable electric battery 37, each of the plurality of batteries being uniquely coupled to one of the elements 12–23 and to console 24.

Figure 17:
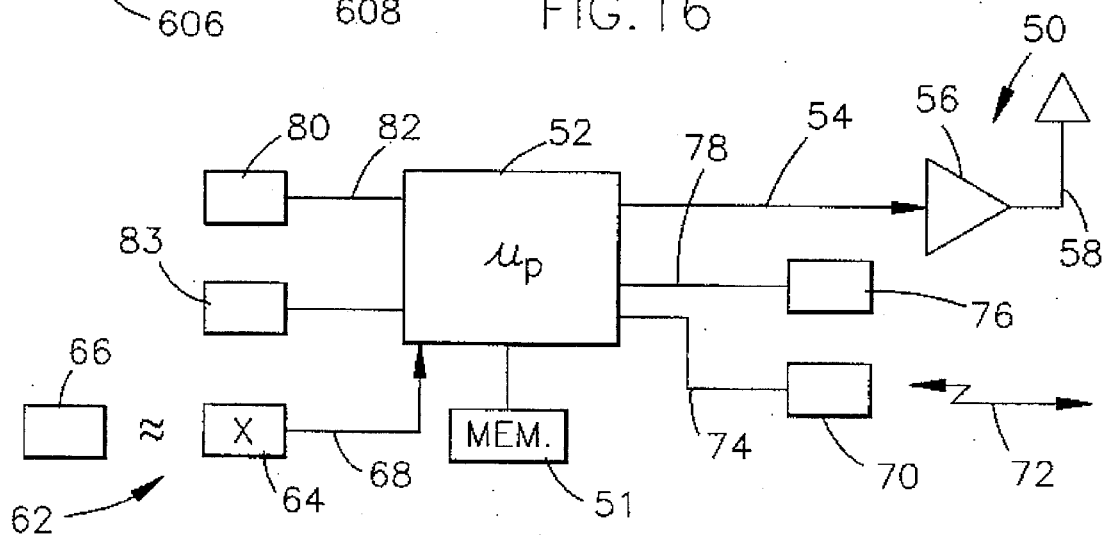
FIG. 17 is a block diagram of the various alarm elements shown in FIG. 1.

To understand the operation of system 10, reference is now made to FIG. 17 which shows a block diagram 50 representing the structure of each of the elements 12, 14, 16, 18, 20, 22, and 23. As shown, each of these elements 12–23 includes a microprocessor 52 under stored program control and having an output signal 54 coupled to an amplifier 56. The output of amplifier 56 is coupled to an antenna 58 in the configuration associated with elements 12–23 or to a sound or siren generator 60 in the configuration associated with element 22.

As further shown, microprocessor 52, in the embodiments associated with elements 16 and 18, is coupled to a conventional switch 62 having a stationary portion 64 mounted upon a door or window frame and a second movable portion 66 mounted upon the door or window and magnetically coupled to the stationary first portion 64. In this manner, disruption of the coupled magnetic flux between portions 64 and 66 causes an alarm notification signal 68 to be generated to microprocessor 52. Upon receipt of signal 68, microprocessor 52 generates the signal 54 which causes an electromagnetic signal 26 to emanate from antenna 58. In this manner, console 24 is made aware of a door or window opening.

In the passive infrared element embodiment 14, switch 62 is replaced with an infrared transceiver 70, adapted to output an infrared signal 72 and to detect signal interference. As should be known to those skilled in the art, transceiver 70 may utilize other forms of radiation including visible light. Upon interruption of signal 72 (i.e. such as when someone enters a room having element 14), transceiver 70 sends an alarm notification signal 74 to microprocessor 52. Upon receipt of signal 74, microprocessor 52 generates the output signal 54 which is amplified and output to antenna 58. Signal 26 is then produced by antenna 58 and communicated to console 24. In this manner, console 24 is made aware of the presence of someone entering a room.

Similarly, motion control activation element 20 comprises microprocessor 52, amplifier 56, and antenna 58 in combination with a typical motion control sensor element 76. Sensor 76 is adapted to be mounted upon a window or other portion of a house. When sensor 76 detects motion, an alarm notification signal 78 is coupled to microprocessor 52 and causes the microprocessor 52 to generate signal 54 in the manner previously described. In this manner, a signal 26 is generated to console 24 effective to indicate unwanted motion.

In the configuration of smoke detection element 12, microprocessor 52 is coupled to a smoke detection sensor 80 which generates an alarm notification signal 82 to microprocessor 54 upon the detection of smoke. Upon receipt of signal 82, microprocessor 52 generates signal 54 to antenna 58 in the previously-described manner. A signal 26 is then produced, indicating the presence of smoke. Lastly, in the heat detection element configuration, a conventional heat detection sensor 83 is coupled to microprocessor 52 and generates an alarm notification signal upon detection of heat. Upon receipt of the generated heat detection signal, microprocessor 52 generates a signal to console 24 by means of antenna 58 thereby informing console 24 of the detection of heat.

From the foregoing discussion, it should be apparent that elements 12, 14, 16, 18, 20, 22, and 23 may be constructed by use of a single microprocessor 52 and may selectively generate an electromagnetic signal 26 to console 24 upon the occurrence of an alarm condition such as the detection of smoke, door or window opening, motion and/or heat detection, or the interruption of an infrared field. Upon receipt of an alarm signal 26, console 24, according to the teachings of the preferred embodiment of this invention, is adapted to provide certain functionality which will be described and which is defined by a stored computer program.

In the preferred embodiment of this invention, signal 25 is also selectively effective to suppress the generation of signal 26 from certain of the elements 12–20 and 23. For example, in the "home" activation mode, element 14 is prevented from generating a signal 26 in order to prevent false system activation by an individual home resident moving throughout the house. In the "away" activation mode, each element 12–20 and 23 may be allowed to generate signals 26 in the foregoing manner since "false alarms" will not be generated by house residents. Alternatively, each element 12–20 and 23 may always be allowed to appropriately generate signals 26, but some of these signals are ignored and not acted upon by console 24 when in the "home" or "away" activation modes. This alternative configuration allows elements 12–20 and 23 to have a simpler stored program.

In the siren element configuration 22 (shown in FIG. 25) a microprocessor 700 is coupled through an amplifier 56 to a sound generator 60 which generates a sound of a selected volume and frequency. Such sound, in the preferred embodiment of this invention, is generated only upon receipt of a signal 82 to antenna 701 and emanating from console 24. In this manner, siren 22 may be selectively "activated" (i.e. allowed to produce sound) upon receipt by console 24 of any of the signals 26 emanating from elements 12, 14, 16, 18, 20, and/or 23.

As should further be apparent to one of ordinary skill in the art, repeater 28 is used to insure that signals 26 emanating from each of the elements 12–23 are received by console 24 and that any signals 25 emanating from console 24 are received by these elements 12–23.

As shown best in FIG. 20, repeater 28 includes a microprocessor 85 under stored program control, a memory 86 containing the stored program, an antenna 87, and transceiver 88. Analogue signal 25 is received through antenna 87 and transceiver 88, which includes an analog to digital converter. The digitized data is coupled to microprocessor 85 and eventually stored into memory 86. The stored data is then coupled to transceiver 88, converted to analogue form, and re-transmitted as signal 30 from antenna 87. Such stored retransmission is preferred over conventional signal amplification since noise and spurious signal reductions are improved. Moreover, such retransmission allows for error correction processing of the received data and also allows for a transmitted signal of greater power. Alternatively, repeater 25 could be replaced with a conventional amplifier arrangement that is effective to receive signal 25, amplify the received signal, and transmit the amplified signal to elements 12–23. Moreover, in the preferred embodiment of the invention each repeated data stream has a tag appended to it in order to ensure that the data is identified as repeated by a specific repeater. In multiple repeater systems, such a tag is used to prevent two or more repeaters from continually repeating the data (i.e. only a single repeat of the data is allowed by each repeater).

Figure 18:
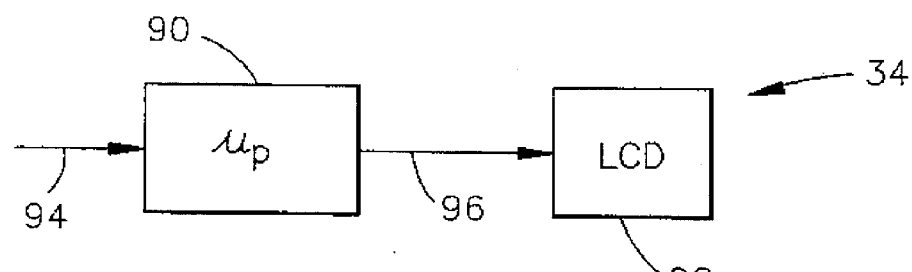
FIG. 18 is a block diagram illustrating the annunciator shown in FIG. 1.

To understand the operation of annunciator 34, reference is now made to FIG. 18. As shown, annunciator 34 includes a microprocessor 90 under stored program control and having an input which is in wireless communication with console 24 by means of signal 94. Microprocessor 90 has an output coupled to a liquid crystal display 92. In the preferred embodiment of this invention, console 24 generates an electromagnetic signal 94 which is received by microprocessor 90 and which causes microprocessor 90 to generate a signal 96 to liquid crystal display portion 92. Signals 94 and 96 each identify those elements 12, 14, 16, 18, 20, 22, and 23 which are currently "activated" (i.e. capable of selectively generating a signal 26), those elements 12–23 which have generated a signal 26, and the mode that system 10 is operating within (i.e. the previously-described "home" or "away" modes). In this manner, a user may quickly and efficiently determine which of the status of system 10. Moreover, it should also be apparent to one of ordinary skill in that annunciator 34 may be easily adapted to display any desired aspect of system 10 operation in order to improve status recognition and that liquid crystal display portion 92 may be replaced with virtually any other type of display including a cathode ray tube monitor and/or a light emitting diode array.

Figure 2:
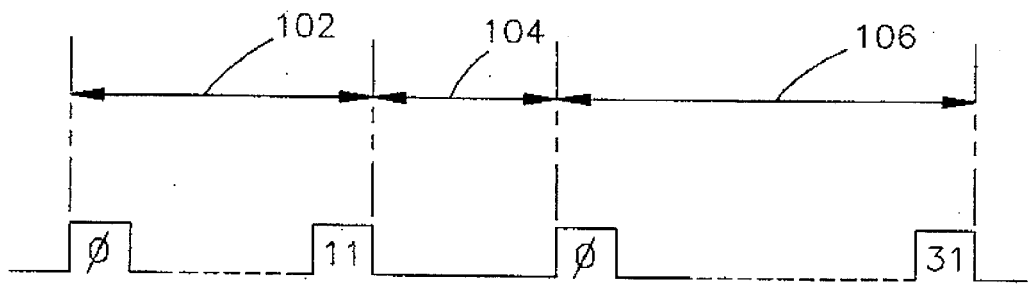
FIG. 2 is an illustration of the data communication format used by the preferred embodiment of this invention.

To further understand the communication between controller 24 and elements 12–23 reference is now made to FIG. 2 where there is shown a data format 100 made in accordance with the teachings of the preferred embodiment of this invention and used within signals 25, 26, 82, and 94.

As shown, data format 100 includes a first twelve bit portion 102 used as a preamble in order to allow the receiving entity 12–24 and 34 to synchronize its conventional internal clock (not shown) to the stream of data which is to follow, and to allow the receiving entity 12–24 and 34 to determine the data rate. Format 100 further includes a second four bit portion 104 having a series of logically low values and adapted to increase noise immunity of data included within format 100. Lastly, format 100 further includes a third thirty-two bit portion 106 which is used to transmit alarm data. In the preferred embodiment of this invention, format 100 employs manchester coding in which a logically low value is represented by a first half bit having a carrier of a frequency of approximately 314.2 Mhz followed by an absence of the carrier in the next half bit. A logically high value reverses the order of carrier and non-carrier intervals. Each bit width is approximately 400 microseconds. As should be apparent to those of ordinary skill in the art, portion 100 is used by elements 12–23 to identify themselves to console 24 and to indicate various alarm conditions. For example, portion 106 of elements 16 and 18 comprises the following format:

1 xxx xxxx xxxx FFFF 1 xxx xxxx xxxx TSSP where "1" denotes a logically high value; "x" cooperatively denotes the code or identify of the device; values associated with portion "ss" denotes an element type (i.e. "door/window"), values associated with portion "r" denotes a trip or no-trip condition, values associated with portion "p" defines the parity, and where values associated with portion "FFFF" denotes the data message to be transmitted such as, for example, low battery, trip, or a test message. In the preferred embodiment of this invention, each element 12–23 periodically transmits a test signal 26 to console 24 at predetermined intervals of time in order to allow console 24 to ascertain whether these elements 12–23 continue to function.

Moreover, portion 106 of signal 82 comprises the following format:

1 ZZZ xxxx xxxx FFFF 0ZZZ xxxx xxxx TSSP where "1" denotes a logically high value; "0" denotes a logically low value; "x" cooperatively denotes the code or identity of the device; values associated with portion "p" denote parity; values associated with portions "ss" denotes communication with siren 22; the value associated with portion "T" is logically high only when signal 82 is communicated to siren 22; and values associated with portion "FFFF" denote either a previous activation of one of the elements 12–23 (i.e. receipt of a signal 26 by console 24) or a "subfunction". If the values associated with portion "FFFF" denote an element activation, the values of the portions "ZZZZZZ" denote a type of element that was activated (i.e. types 12–23). If a "subfunction" is denoted by portion "FFFF" then portions "ZZZZZZ" are used to provide additional element commands. Alternatively, values associated with portion "ZZZZZZ" may selectively cause microprocessor 52 to selectively deactivate siren 22 or to briefly generate a sound in order to determine whether siren 22 remains operational.

From the foregoing discussion, it should be apparent to one of ordinary skill in the art that elements 12, 14, 16, 18, 20, 22, 23, 28, and 34 and controller 24 wirelessly communicate thereby obviating the need for a physical or "hard wired" connection between each of these elements 12–23, 28, and 34 and the controller 24. In this manner, system 10 may be easily adapted and reconfigured to meet changing system needs.

In order to allow each of the elements 12–23, and 28 to selectively communicate with console 24, a timing software routine is necessary. In the preferred embodiment of the invention, the timing routine is embedded within the software controlling microprocessor 52 and is effective to reduce the probability of substantially simultaneous transmissions from two different elements 12–23, 28, and 34. Such simultaneous transmissions may destructively and electromagnetically interfere thereby preventing desired communication with console 24.

Specifically, in the preferred embodiment of this invention, the identification code for each of the elements 12–23, 28, and 34 form a binary sequence and are predetermined in a random manner and are stored within these elements 12–23, 28, and 34 before such system 10 becomes operational. To understand how these predetermined identification codes are used by the preferred embodiment of this invention to reduce the probability of destructive transmission interference, reference is now made to FIG. 3.

As shown in flowchart 110, the unique identification data is read in step 112. In the preferred embodiment of this invention, each element 12–23, 28, and 34 is adapted to transmit signal 26 only during a specific transmit interval period after receipt of an alarm notification signal (i.e. such as the signal produced by switch 62). This transmit interval portion is defined in step 116.

The defined transmit interval is divided into four sections in step 118, but in other embodiments of this invention may be divided in different numbers of sections. In step 120, the first two bits of the unique and randomly generated identification format or code for each of the elements is selected. In step 122, the transmit interval section is selected by use of the first two bits which were produced in step 120. For example, bits "10" (where "1" denotes a logically high value and "0" denotes a logically low value) denotes section two, bits "00" denote section zero, bits "11" denote section three, and bits "01" denote section one. The second, third, and fourth, and other consecutive bit pairs are then used to further define transmit intervals. In this manner, as shown in step 123 and 125 twenty transmissions are achieved.

Therefore, the use of randomly generated identification numbers, sectionalized transmit intervals, and the selection of transmit interval sections by the first two bits of the randomly generated identification code reduces the probability that any two elements 12–23 will produce or transmit data during the exact same time. Moreover, each element 12–23 is made to continuously generate data for the entire predetermined section time, thereby allowing the data that may have been destructively interfered with during a portion of time to eventually be received by controller 24.

To understand the operation of control transmitter 27, reference is now made to FIGS. 21 and 4(a–b). It should be realized that remote keypad 32 may be substantially identical to the transmitter shown in FIG. 21 and explained below except that keypad 32 may include a plurality of switches which allow keypad 32 to perform the below-described functions of transmitter 27 and to create codes for each element 12–23 within console 24. These codes may also be created by a remote programming terminal. As shown best in FIG. 21, transmitter 27 includes a microprocessor 123 under stored program control, switches 124, 126, oscillator 127, and antenna 128. It should be noted that different numbers of switches 124, 126 may be employed in other embodiments of transmitter 27. In operation, depression of switches 124, 126 causes microprocessor 123 to activate oscillator 127 such that a unique signal is output from oscillator 127 for each respective depression of switches 124, 126 and for a dual switch depression. The output signal from oscillator 127 is coupled to antenna 128 where it is output as signal 29.

As shown in a first transmitter embodiment (FIG. 4(a)), transmitter 27 includes a "home" switch 129, an "away" switch 131, a "disarm" switch 133, and a "panic" switch 135. As previously described, depression of any of the switches 129, 131, 133, and 135 causes a unique electromagnetic signal 29 to be generated and transmitted. Any concomitant depression of two or more of these switches 129, 131, 133, and 135 also causes a respectively unique signal 29 to be generated.

Specifically, depression of switch 129 causes certain of the elements 12–23 to be enabled in a first "home" mode, while depression of switch 131 causes signal 29 to be effective, when received by controller 24 to cause certain of the elements 12–23 to be enabled in the second "away" mode. A "non-enabled" element will not selectively generate electromagnetic signals 26 even though its alarm condition may have been achieved (i.e. its microprocessor 52 receives an alarm notification signal). Depression of switch 133 disables each of the elements 12–23 while depression of switch 135 generates a signal 26 to console 24 which places the console in its "alarm" mode. As earlier stated, a disabling of elements 12–23 may also be accomplished by having console 24 ignore or fail to respond to certain of the signals 26 emanating from the disabled elements 12–26.

To understand how console 24 is made to respond to signal 29, reference is now made to flowchart 130, in FIG. 5. As shown, console 24 first learns the transmitter identification code in step 132. Specifically, in the preferred embodiment of this invention, each transmitter 27 is made to have one of a plurality of predetermined binary identification codes. Console 24 is put into a "learn" mode and transmitter 27 is made to generate signal 29, including the unique identification bits associated with the transmitter. Upon receipt of the identification bits, console 24 places these bits in memory. Upon a later transmission by the transmitter 27, console 24 compares the currently generated identification bits to those stored. If this comparison is identical, console 24 responds in the requested manner. Should this comparison fail, console 24 fails to respond or ignores the received command. Moreover, in the preferred embodiment of this invention each of the elements 12, 14, 16, 18, 20, 22, and 23 have a unique identification code which is learned in this manner by the console 24. In step 134, each of the learned elements is assigned a unique zone number, while in step 136 each of the elements is assigned one of several predefined element functions. Alternatively, console 24 may recognize the identification codes as it receives them thereby obviating the need for a formal programming procedure.

To understand the selection and assignment of transmitter functions, reference is now made to FIG. 6 where there is shown a table 150. According to the teachings of the preferred embodiment of this invention, ten distinct types of predefined alarm elements are employed, and are selectively attached to or uniquely associated with one or more of the elements 12–23. That is, each element 12–23 employed within system 10 is made to have one element of this configuration uniquely associated with it. The associated configuration is stored within the memory of console 24 and used to determine the response of console 24 to a signal 26 emanating from these elements 12–23. In this manner, a user of system 10 simply needs to define or ascertain the type of elements that are to be used and does not need to explore exactly how the defined element operates. Such predefined operational element signatures therefore allows system 10 to be easily installed, configured, and later modified.

Specifically, a first element type 152 is referred to as a "DW instant" and is uniquely associated with elements 16 and 18. Specifically console 24 responds to a signal 26 emanating from elements 16 and 18 in both the "home" and "away" modes. Moreover, console 24 activates siren 22 upon receipt of signal 26 generated from elements 16 and 18. Second element type 154 is referred to as a "DW delay" and differs from type 152 in that the console response to signals 26 is delayed a certain amount of time. If console 24 receives a disarm signal before the end of a certain entry delay interval, console 24 will ignore the signal. This allows, for example, a homeowner to enter the house and deactivate system 10 before siren 22 is activated. Such deactivation being allowed even though these elements 16, 18 have been "tripped" or received an alarm activation signal.

The third element type 156 is referred to as a "PIR" and is a passive infrared type which is uniquely associated with element 14. As shown, console 24 responds to a signal 26 emanating from device 14 only when console 24 is in the "away mode". Such response includes siren activation. Fourth element type 158 is referred to as a "panic" type and is uniquely associated with signals emanating from transmitter 27. Depression of switch 135, by a first embodiment of transmitter 27, will cause the activation of siren 22 regardless of the mode that the system is In. Fifth transmitter type 160 is substantially similar to type 158 with the exception that a conventional "medical" transmitter 137 may replace transmitter 27.

Sixth element type 162 is referred to as a "smoke" type and is uniquely associated with smoke detector element 12. Console 24 upon receipt of signal 26 emanating from transmitter type 162 operates in a manner which is substantially identical to console operation associated with types 156, 158, and 160. Seventh element type 164 is referred to as a "heat" type and is uniquely associated with heat element 23. Console operation associated with a receipt of signal 26 emanating from element 23 is substantially identical to console operation associated with types 156–162. Eighth element type 166 is referred to as a "glass break" and is uniquely associated with motion detector 20. As shown, motion detector 20 become activated in the "home" and "away" alarm system modes and is further effective to have console 24 generate a signal to siren 22 effective to activate the siren upon receipt of signal 26 from detector 20.

The ninth element type is referred to as "utility" type and is associated with a conventional sensor 181 used to detect such occurrences as a high water level. Console 24 responds to sensor 18 regardless of the current alarm system mode but does not activate siren 22. Sensor 181, in the preferred embodiment of this invention may be substantially similar to heat detection sensor 33 with the exception that sensor 83 is replaced with a level sensor (not shown). The last alarm element type of the preferred embodiment of this invention is referred to as an "interior" type 170. Console 24 responds to a signal 26 emanating from element type 170 only during an "away" mode. Such console response includes siren activation. In this manner, interior sensor 170 will not become activated by an activity occurring within the house but will only become activated upon entry from outside of the house. One example of such an "interior sensor" is an element 18 deployed upon a basement door. Defining element 18 in this interior manner allows individuals residing within the house to use the basement door without activating the alarm but when gone, to arm the door against entry. Moreover, as further shown in FIG. 6, element types 152 and 154 are also effective to cause console 24 to activate siren 22 when receiving a previously-described "check-in" signal 26 while only element types 156–162 may be deleted by means of console 24.

To understand the operation of a two switch transmitter 27', made in accordance with the teachings of a second embodiment of this invention, reference is now made to tables 180 and 200 shown in FIGS. 7 and 8. As shown, transmitter 27' may be of one of six types shown in FIGS. 7 and 8.

That is, transmitter 27' in the first embodiment is effective to place system 10 in the "home mode" on a first depression of switch 172 and in the "away mode" on a subsequent depression. Alternatively, depression of switch 172 is effective to place system 10 in either an armed "home" or armed "away" mode while depression of switch 174 places system 10 in the "disarm" mode. As before, depression of both switches 172, 174 causes a "panic" system response. In this manner, it should be apparent to one of ordinary skill in the art, that two switch transmitter 27' may be easily and selectively adapted to meet a wide variety of needs.

Referring now to FIG. 8, there is shown another alternative embodiment of a two switch transmitter 27'. As shown, two switch transmitter 27' may alternatively be of a type 188, 190, or 192. In transmitter type 188, switch 172 concurrently (with each depression) arms system 10 in an armed/home, armed/away, and disarmed mode. Switch 174 is not employed for use in security system 10 but may alternatively be used to arm and disarm a typical vehicle alarm. As before, depression of both switches 172, 174 causes a panic operation to occur.

In transmitter type 190, depression of switch 172 arms system 10 in a "home" mode only while a second depression of switch 172 disarms system 10. As before, depression of both switches 172, 174 causes a panic situation. Switch 174 is used to activate a typical vehicle alarm. Transmitter type 192 is effective when switch 172 is depressed to selectively arm system 10 in the "away mode". A second depression of switch 172 disarms system 10. Selective depression of both switches 172, 174 causes a panic situation to occur while a selective depression of the right switch may be used in conjunction with a typical vehicle alarm system.

In this manner, it should be apparent to one of ordinary skill in the art that two switch transmitter 27' may be selectively modified to allow the transmitter to be used in combination with a typical vehicle alarm system (not shown) and with a home security system, such as that shown and described with reference to FIG. 1. Moreover, in the preferred embodiment of this invention remote keypad 32 includes no code stored therein in order to substantially prevent a thief from learning the code. Rather, central station 24 learns the code emanating from keypad 32 in a manner previously described.

In order to conserve the amount of electrical power consumed by system 10, in the preferred embodiment of this invention each of the elements 12–23, controller 24, and repeater 28 which are selectively adapted to receive a signal 26, 25, 30 are normally placed in a "passive" mode and are "awaken" or made operational only upon recognition of a modulation signal envelope, corresponding to a signal to be received. In the preferred embodiment of the invention the means for recognition is a passive low or non-power consumption device such as a crystal detector. For example, in one embodiment of this invention signals 25, 26, 29, 94, and 31 are amplitude modulated through other types of modulation techniques may be employed.

Specifically, the electrical power conservation technique will be discussed with reference to its use by elements 12–23, it being understood that the described technique is substantially identical to that used with console 24, repeater 28, and annunciator 34. As shown with reference to the electrical schematic diagram 210 of FIG. 9, antenna 58 of each element 12–23 is coupled to electrical ground through a parallel arrangement of inductance coil 214 and capacitor 216. Antenna 58 is further coupled, as are coil 214 and 216, to a series arrangement of diode 218, capacitor 220, and a low power amplifier 222. The output of amplifier 222 is coupled to the conventional "IRQ" port of microprocessor 52. In this manner, microprocessor 52 is placed in an activated state only when coil 214 and capacitor 216 detect the occurrence of an amplitude modulated signal, thereby conserving power during periods of non-system communication. Moreover, in the preferred embodiment of this invention, the inductance of coil 214 is selected in order to allow for different types of carrier frequencies to be utilized within system 10.

In order to provide a low battery signal indication, microprocessor assembly 52 of each of the elements 12–23 is modified according to the electrical schematic diagram 240 of FIG. 10. Specifically, microprocessor 52 which has an output antenna 58 which is adapted to cooperate with microprocessor 52 in order to generate output signals 26 in the previously-described manner. Moreover, in the preferred embodiment of this invention, microprocessor 52 has a first input which is coupled to a first resistor 242 and a second input coupled to resistor 244 and in parallel with resistor 242. Resistor 244 is coupled to a source 245 of approximately nine volts. In this manner, should the voltage of the source decrease beyond a selectable amount, defined by the values of the resistance of resistors 244 and 242, microprocessor 52 is adapted to generate a signal 26 by means of antenna 58. In the preferred embodiment the selectable amount is defined to be the device threshold. Hence, this structure provides a low cost battery detect circuit. Moreover, resistor 242 is selectively coupled to ground when battery detection is required and is made to float otherwise. In this manner, power consumption by microprocessor 52 is reduced wherein a "sleep" state sure process 52 comprises a microchip PIC 16C54.

Figure 12:
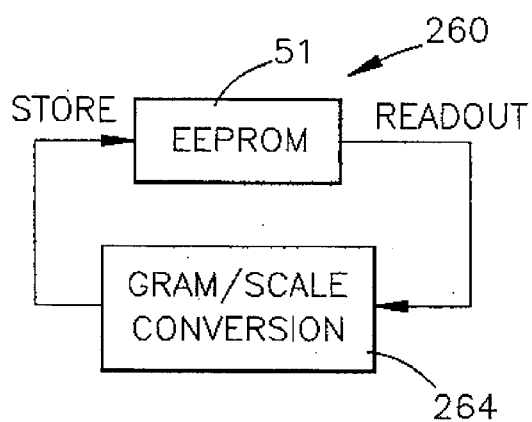
FIG. 12 is a block diagram illustrating the manner in which data is read and stored within the various microprocessor assemblies utilized by the preferred embodiment of this invention.

Moreover, Applicant has found that the use of conventional "EE PROMS" as memory 51 is advantageous, even though each of the memory storage have only a fixed amount of "read" and "write" operations which may be achieved over the useful life of the memory. Since only a few locations of memory 51 contain operational data (i.e. as opposed to data of the stored program) these will be the first to fail since these operational or "working" locations will have a high usage rate. To increase the operational life of this "EE prom" memory 51, a grey scale storage technique is used, as shown in block diagram 260 of FIG. 12. Alternatively, original memory locations having a width or storage capacity larger than the stored contents may be reused or cycled in a grey scale manner. In this alternative embodiment, the binary content is increased, converted to grey scale, and stored. In this manner, a decrease in the usage of a specific memory portion or bit location is achieved.

Specifically, memory 51 is coupled to a conventional grey scale conversion device 264 which receives the output or "read" data (having certain memory pointers which are used to identify the location the data is to be restored within) from memory 51, converts the "read" data to grey scale values, and stores the modified data in various locations within memory 262. These various locations differ from the locations which originally contained the data. In this manner, the "read-cycles" associated with the various locations within memory 262 are reduced.

Figure 11:
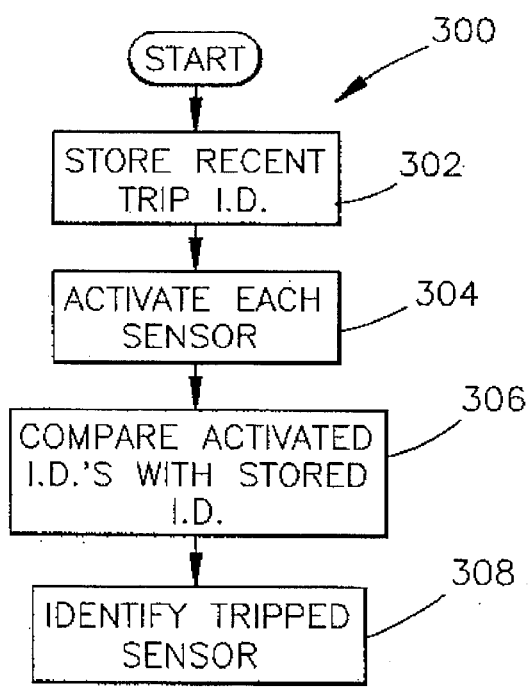
FIG. 11 is a flowchart illustrating the sequence of steps associated with the identification of a "tripped" or activated alarm element.

Moreover, in the preferred embodiment of this invention, console 24 is further adapted to identify these elements 12–23 have been activated. To understand this operation, reference is now made to flowchart 300 shown in FIG. 11. Specifically, console 24 is adapted in step 302 to store the unique identification data associated with those elements 12–20 and 23 which have generated a signal 26. In step 304 console 24 is further adapted to activate each of the elements 12–20 and 23. In step 306 console 24 compares each of the activated identification data received in step 302 with the stored identification data. This comparison, in step 308, is effective to identify the activated element. Such identifications, as previously described, may be transmitted to annunciator 34 by means of signal 94.

Figure 13:
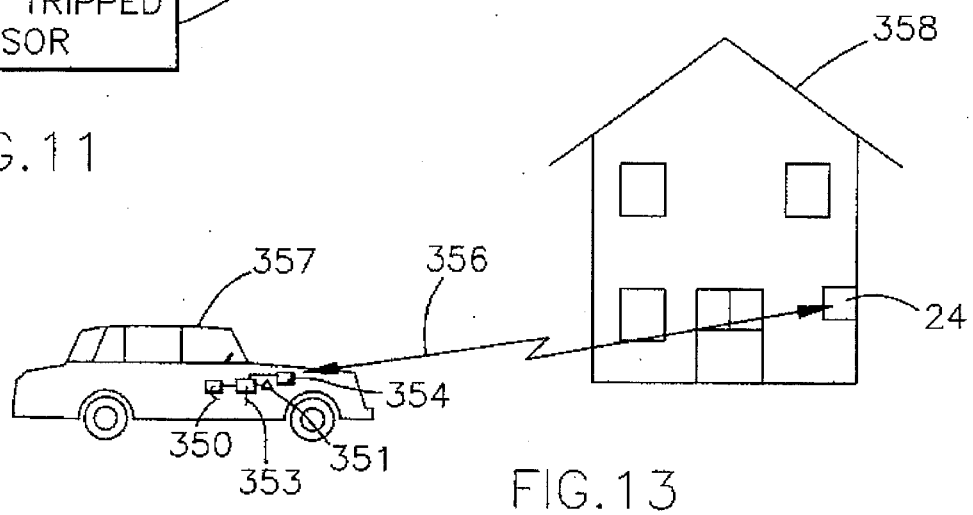
FIG. 13 is a block diagram illustrating the use of the system shown in FIG. 1 in combination with a typical automobile security system.

Referring now to FIG. 13, there is shown system 10 in combination with a typical vehicle security system 350 such as that described within U.S. Pat. No. 5,049,867 issued on Sep. 17, 1991, assigned to Applicant's assignee, and fully incorporated herein by reference. As shown, vehicle security system 350 includes an antenna 351 and a transmitter 353. System 350 is electrically coupled to vehicle starter 354 and produces a signal 356, by means of transmitter 353, when starter 354 is activated (i.e. when the engine (not shown) is started). Signal 356 is effective to cause console 24 to activate system 10 in either the "away" or "home" mode. In this manner, the need for formal activation of system 10 is obviated and will occur automatically upon the starting of vehicle 351 thereby ensuring that system 10 becomes activated when a homeowner leaves the house. Moreover, the auto security system may be further adapted upon the deactivation of the auto ignition to provide a signal to console 24 indicating that the automobile is in the garage. The automobile therefore becomes a security element of system 10, much like elements 16, 18 which provide a signal when a contact has been broken (i.e. the ignition is activated).

Figure 14:
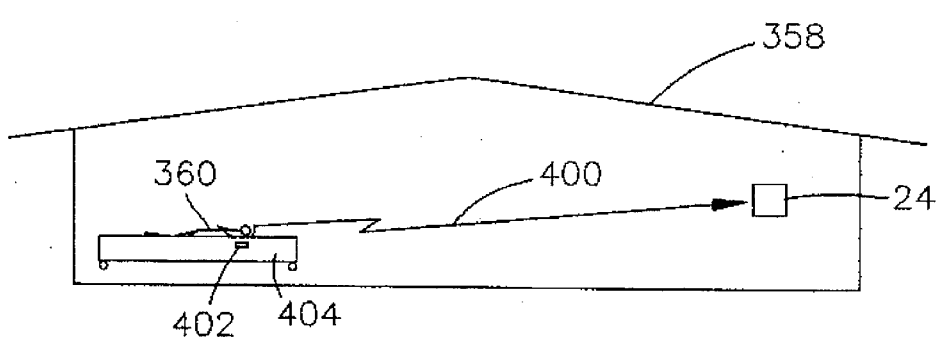
FIG. 14 is a block diagram illustrating the use of a mattress sensor in combination with the system shown in FIG. 1.

Moreover, as shown in FIG. 14, console 24 may be further adapted to receive a signal 400 from a pressure sensor assembly 402 (similar to element 20) placed within or under mattress 404. In this manner, an individual residing within house 358, when retiring for the evening, automatically activates sensor 402 thereby causing signal 400 to be produced. Upon receipt of signal 400, console 24 automatically activates system 10 in the "away" mode and upon release of sensor 402 (i.e. when resident 360 lowers mattress 404), signal 400 causes console 24 to activate system 10 in the "home" mode, allowing the individual to travel through the house. In this manner, formal activation and deactivation of system 10 is obviated when individuals residing within home 358 go to bed. Alternatively, system 10 may have a remote annunciator (i.e. voice) which automatically inform a user in automobile 357 or within room 359 of the state of the system and either automatically changes the state or awaits further commands to do so. Moreover, the status of system 10 may also be used for other purposes. For example, an "armed away mode" indicates that residents are gone from a house and this information may be used to automatically turn down the heat and turn off or deactivate certain appliances, such as a coffeemaker.

Figure 15:
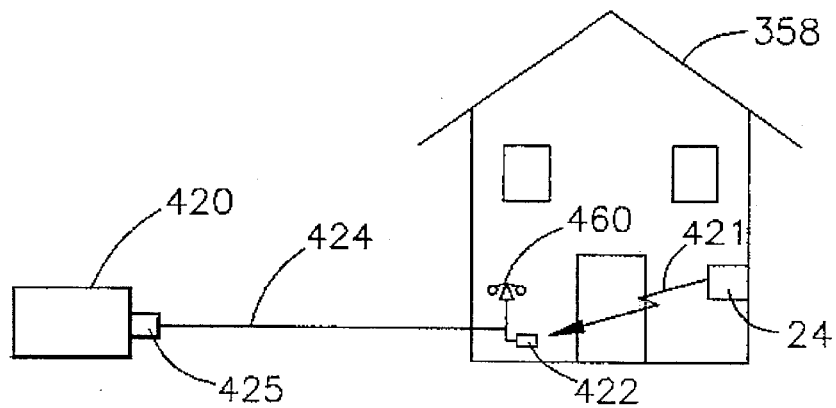
FIG. 15 is a block diagram illustrating a remote and central alarm monitoring system in combination with the system shown in FIG. 1.

As shown in FIG. 15, console 24 may be further adapted to signal a central and remote alarm station 420 upon alarm activation. Specifically, receiver 422 wirelessly receives signal 421 emanating from console 24 and produces modulated data upon a conventional telephone line 424. In this manner, remote station 420 demodulates the data by means of modem 425 and becomes aware of an activation within home 358.

As shown in FIG. 22, telephone interface receiver 22 comprises a microprocessor 450 having a memory 452 which contains a stored program that controls the operation of microprocessor 450. Receiver 422 further includes an antenna 454 which is adapted to wirelessly receive signal 421 from console 24 and to couple the received signal to microprocessor 450. Lastly, receiver interface 422 includes a conventional telephone jack 456, such as a RJ-11 or RJ-455.

In operation, analogue signal 421 is received by antenna 454 and coupled to microprocessor 450. The analog signal 421 is digitized and modulated by microprocessor 450 and the modulated and digital signal is placed onto telephone line 424 by means of interface 456. In this manner, receiver 422, as should be apparent to one of ordinary skill in the art, wirelessly receives alarm data from controller 24 and transmits this wireless data to a central alarm station 420 by means of a conventional telephone line 424. Alternatively, it should also be realized that coupler 456 may comprise a conventional auto-dial modem which is coupled to a telephone 460 and which dials a telephone number of central station 420, having a second auto-dial modem 425. In this manner a "hard-wired" telephone line is not required between station 420 and dwelling 358, thereby reducing cost.

In a second telephone interface embodiment, shown in FIG. 19, console 24 having a microprocessor 224 and a memory 262 which contains a stored program to control microprocessor 224 in the previously-described manner, is physically connected to a telephone interface 506. As shown, console 24 includes an antenna 508 which cooperates with microprocessor 224 to produce signals 25 and 94 and to receive signals 26 and 29 in the previously-described manner. Microprocessor 224 further includes an analog to digital converter 510 which digitizes the received analog signals 26 and 29 and produces analog signals 25 and 94 from digital data residing in microprocessor 224.

In this second telephone coupling embodiment, microprocessor 224 receives an analog alarm signal 26 from elements 12–23, digitizes the signal, and couples the digital signal to square-wave circuits 502 and filter 504, effective to correctly shape and modify the signal for remote transmission. The digitized and shaped signals is coupled to a typical telephone interface 506 where it is modulated upon a conventional telephone line 424 in the manner previously described. As should be apparent to those of ordinary skill in the art, this second telephone interface embodiment differs from that shown and described with reference to FIG. 22 in that a wire must be physically coupled between interface 506 and microprocessor 224.

Figure 26:
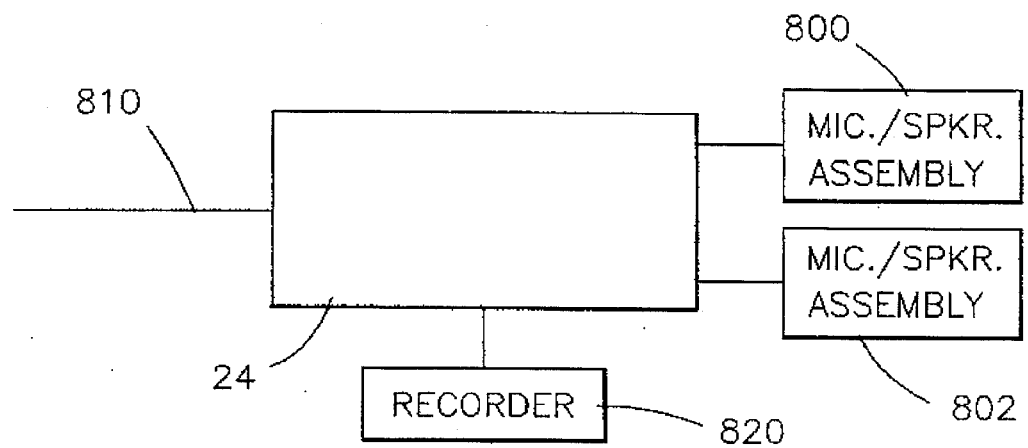
FIG. 26 is a block diagram of a microphone/speaker assembly portion of the security system of this invention.

As shown best in FIG. 26, system 10 may also include several conventional microphones and speaker assemblies 800, 802 which are coupled to console 24 and which may be distributed throughout the secured structure or house. Console 24 (i.e. microprocessor 224) upon receipt of a signal or telephone line 810 allows audio signals from assemblies 800, 802 to be placed on the line 810 and further allows signals from line 810 to be coupled to assemblies 800, 802. In this manner, one may "dial up" system 10 and monitor audible signals in a house or structure and further communicate with those in the home. In the preferred embodiment of the invention, console 24 may also include a correctional audio recorder 820 which is adapted to recordably store audio signals emanating from assemblies 800, 802 at a predetermined time after alarm activation and/or before alarm activation. Such prealarm activation recorded is achieved since, in this embodiment, audio signals are received and recorded continually. Hence, audio signals are recorded even during unwanted entry but before such entry activates or alarms the system (i.e. during an alarm delay interval).

In the preferred embodiment of this invention, all analog to digital conversation, such as that associated with converter 510 is done in a tri-state resistor embodiment. That is, in the preferred embodiment of this invention a conventional weighted current source or ladder type digital to analog converters may be used with four resistors having the values shown in Table 1 below:

TABLE 1

RESISTOR VALUES FOR DIGITAL TO ANALOGUE CONVERTER

| | R1 | R2 | R3 | R4 | Top Res | Bot Res | D-A Result |
|---|---|---|---|---|---|---|---|
| 1 | 0 | 0 | 0 | 0 | ∞ | 506 | 0.0% |
| 2 | 0 | 0 | 0 | 1 | ∞ | 541 | 0.0% |
| 4 | 0 | 0 | 1 | 0 | ∞ | 580 | 0.0% |
| 10 | 0 | 1 | 0 | 0 | ∞ | 678 | 0.0% |
| 5 | 0 | 0 | 1 | 1 | ∞ | 625 | 0.0% |
| 11 | 0 | 1 | 0 | 1 | ∞ | 741 | 0.0% |
| 13 | 0 | 1 | 1 | 0 | ∞ | 816 | 0.0% |
| 28 | 1 | 0 | 0 | 0 | ∞ | 1,026 | 0.0% |
| 14 | 0 | 1 | 1 | 1 | ∞ | 909 | 0.0% |
| 29 | 1 | 0 | 0 | 1 | ∞ | 1,176 | 0.0% |
| 31 | 1 | 0 | 1 | 0 | ∞ | 1,379 | 0.0% |
| 37 | 1 | 1 | 0 | 0 | ∞ | 2,105 | 0.0% |
| 32 | 1 | 0 | 1 | 1 | ∞ | 1,667 | 0.0% |
| 38 | 1 | 1 | 0 | 1 | ∞ | 2,857 | 0.0% |
| 40 | 1 | 1 | 1 | 0 | ∞ | 4,444 | 0.0% |
| 41 | 1 | 1 | 1 | 1 | ∞ | 10,000 | 0.0% |
| 3 | 0 | 0 | 0 | 2 | 8,000 | 541 | 6.3% |
| 6 | 0 | 0 | 1 | 2 | 8,000 | 625 | 7.2% |
| 12 | 0 | 1 | 0 | 2 | 8,000 | 741 | 8.5% |
| 15 | 0 | 1 | 1 | 2 | 8,000 | 909 | 10.2% |
| 7 | 0 | 0 | 2 | 0 | 4,000 | 580 | 12.7% |
| 30 | 1 | 0 | 0 | 2 | 8,000 | 1,176 | 12.8% |
| 8 | 0 | 0 | 2 | 1 | 4,000 | 625 | 13.5% |
| 16 | 0 | 1 | 2 | 0 | 4,000 | 816 | 16.9% |
| 33 | 1 | 0 | 1 | 2 | 8,000 | 1,667 | 17.2% |
| 17 | 0 | 1 | 2 | 1 | 4,000 | 909 | 18.5% |
| 9 | 0 | 0 | 2 | 2 | 2,667 | 625 | 19.0% |
| 19 | 0 | 2 | 0 | 0 | 2,000 | 678 | 25.3% |
| 18 | 0 | 1 | 2 | 2 | 2,667 | 909 | 25.4% |
| 34 | 1 | 0 | 2 | 0 | 4,000 | 1,379 | 25.6% |
| 39 | 1 | 1 | 0 | 2 | 8,000 | 2,857 | 26.3% |
| 20 | 0 | 2 | 0 | 1 | 2,000 | 741 | 27.0% |
| 22 | 0 | 2 | 1 | 0 | 2,000 | 816 | 29.0% |
| 35 | 1 | 0 | 2 | 1 | 4,000 | 1,667 | 29.4% |

TABLE 1-continued

RESISTOR VALUES FOR DIGITAL TO ANALOGUE CONVERTER

| | R1 | R2 | R3 | R4 | Top Res | Bot Res | D-A Result |
|---|---|---|---|---|---|---|---|
| 23 | 0 | 2 | 1 | 1 | 2,000 | 909 | 31.3% |
| 21 | 0 | 2 | 0 | 2 | 1,600 | 741 | 31.6% |
| 24 | 0 | 2 | 1 | 2 | 1,600 | 909 | 36.2% |
| 25 | 0 | 2 | 2 | 0 | 1,333 | 816 | 38.0% |
| 36 | 1 | 0 | 2 | 2 | 2,667 | 1,667 | 38.5% |
| 26 | 0 | 2 | 2 | 1 | 1,333 | 909 | 40.5% |
| 27 | 0 | 2 | 2 | 2 | 1,143 | 909 | 44.3% |
| 55 | 0 | 0 | 0 | 0 | 1,000 | 1,026 | 50.6% |
| 46 | 1 | 2 | 0 | 0 | 2,000 | 2,105 | 51.3% |
| 43 | 1 | 1 | 2 | 0 | 4,000 | 4,444 | 52.6% |
| 56 | 2 | 0 | 0 | 1 | 1,000 | 1,176 | 54.1% |
| 42 | 1 | 1 | 1 | 2 | 8,000 | 10,000 | 55.6% |
| 57 | 2 | 0 | 0 | 2 | 889 | 1,176 | 57.0% |
| 58 | 2 | 0 | 1 | 0 | 1,000 | 1,379 | 58.0% |
| 47 | 1 | 2 | 0 | 1 | 2,000 | 2,857 | 58.8% |
| 59 | 2 | 0 | 1 | 1 | 1,000 | 1,667 | 62.5% |
| 61 | 2 | 0 | 2 | 0 | 800 | 1,379 | 63.3% |
| 48 | 1 | 2 | 0 | 2 | 1,600 | 2,857 | 64.1% |
| 60 | 2 | 0 | 1 | 2 | 889 | 1,667 | 65.2% |
| 62 | 2 | 0 | 2 | 1 | 800 | 1,667 | 67.6% |
| 64 | 2 | 1 | 0 | 0 | 1,000 | 2,105 | 67.8% |
| 49 | 1 | 2 | 1 | 0 | 2,000 | 4,444 | 69.0% |
| 63 | 2 | 0 | 2 | 2 | 727 | 1,667 | 69.6% |
| 44 | 1 | 1 | 2 | 1 | 4,000 | 10,000 | 71.4% |
| 65 | 2 | 1 | 0 | 1 | 1,000 | 2,857 | 74.1% |
| 73 | 2 | 2 | 0 | 0 | 667 | 2,105 | 75.9% |
| 66 | 2 | 1 | 0 | 2 | 889 | 2,857 | 76.3% |
| 52 | 1 | 2 | 2 | 0 | 1,333 | 4,444 | 76.9% |
| 45 | 1 | 1 | 2 | 2 | 2,667 | 10,000 | 78.9% |
| 74 | 2 | 2 | 0 | 1 | 667 | 2,857 | 81.1% |
| 67 | 2 | 1 | 1 | 0 | 1,000 | 4,444 | 81.6% |
| 75 | 2 | 2 | 0 | 2 | 615 | 2,857 | 82.3% |
| 50 | 1 | 2 | 1 | 1 | 2,000 | 10,000 | 83.3% |
| 70 | 2 | 1 | 2 | 0 | 800 | 4,444 | 84.7% |
| 51 | 1 | 2 | 1 | 2 | 1,600 | 10,000 | 86.2% |
| 76 | 2 | 2 | 1 | 0 | 667 | 4,444 | 87.0% |
| 53 | 1 | 2 | 2 | 1 | 1,333 | 10,000 | 88.2% |
| 79 | 2 | 2 | 2 | 0 | 571 | 4,444 | 88.6% |
| 54 | 1 | 2 | 2 | 2 | 1,143 | 10,000 | 89.7% |
| 68 | 2 | 1 | 1 | 1 | 1,000 | 10,000 | 90.9% |
| 69 | 2 | 1 | 1 | 2 | 889 | 10,000 | 91.8% |
| 71 | 2 | 1 | 2 | 1 | 800 | 10,000 | 92.6% |
| 72 | 2 | 1 | 2 | 2 | 727 | 10,000 | 93.2% |
| 77 | 2 | 2 | 1 | 1 | 667 | 10,000 | 93.8% |
| 78 | 2 | 2 | 1 | 2 | 615 | 10,000 | 94.2% |
| 80 | 2 | 2 | 2 | 1 | 571 | 10,000 | 94.6% |
| 81 | 2 | 2 | 2 | 2 | 533 | 10,000 | 94.9% |

Such a tri-state digital to analog converter produces approximately the same accuracy as conventional digital to analog converters but is more adaptable to the various requirements associated with system 10 and therefore allows for the use of four processor I/$\phi$ points to provide ($3^4$=81) discrete levels as opposed to the sixteen ($2^4$) levels normally available.

Figure 16:
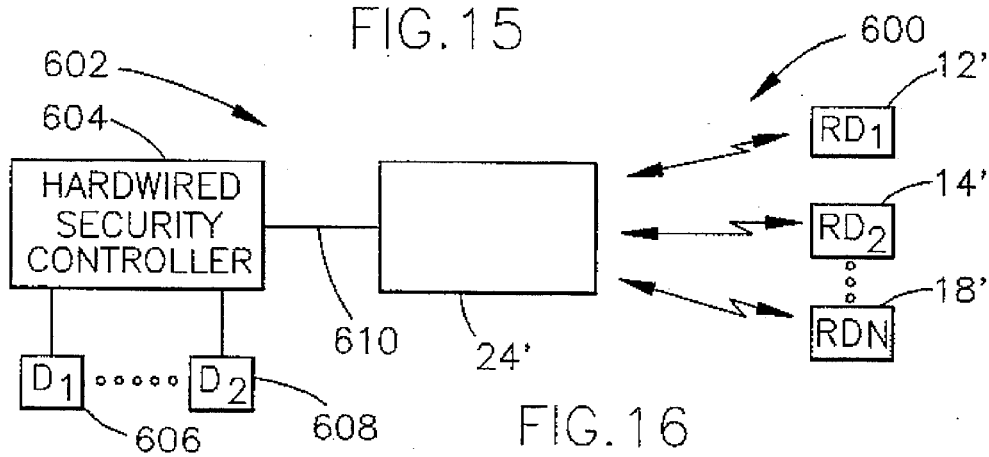
FIG. 16 is a block diagram illustrating the use of system of the preferred embodiment of this invention in combination with a typical "hard wired" home or structural security system.

Referring now to FIG. 16, there is shown an alarm system 600 comprising a typical hard-wired security system 602 including a central controller 604 which is physically coupled to several alarm activation elements 606, 608. As shown, console controller 24' made in accordance with the teachings of a preferred embodiment of this invention and wirelessly communicating to alarm activation 12', 14', 18' which are respectively and substantially similar to elements 12, 14, and 18, may be coupled to controller 604. In this manner, an existing security system 602 may be readily expanded to have the functionality associated with various of the elements 12–23 shown and previously-described with reference to system 10.

In operation, each system 602 and 600 operates in a separate and unique manner until controller 24' receives a signal 26' from any of the elements 12', 14', and 18'. Upon receipt of signal 26', controller 24' generates a signal 610 to controller 604 indicating that one of the elements 12', 14', or 18' has detected an alarm occurrence. This signal 610 thereby causes controller 604 to generate an alarm in a manner consistent with its normal operation. Therefore, it should be apparent to one of ordinary skill in the art that the wireless home security system of the preferred embodiment of this invention may be readily adapted for use in combination with a typical "hard wired home security system", in order to provide additional needed functionality. Moreover, system 24' also is adapted to provide a true indication of the opening state of doors and windows.

Referring now to FIG. 23, there is shown a central control station 420 made in accordance with the teachings of a preferred embodiment of this invention. Specifically, station 420 may comprise one or more personal computers 700 coupled to one or more conventional modems 702. These modems are in communication with microprocessor 224 of controller 24. Upon receipt of alarm information from system 10, personal computer 700, which is under stored program control, is adapted to present such alarm information upon its screen 704 in order to inform an operator of the alarm. This obviates the need for a relatively expensive dedicated receiver. Alternatively, the data may be sent to another display computer.

As shown in FIG. 24, each dwelling 358, in the preferred embodiment of this invention, has a unique configuration file or table 706 associated with it. In one embodiment, each of these files 706 are resident within computer 700 and are also displayed upon a receipt of an alarm signal from the dwelling.

As shown best in FIG. 24, the file includes the home address, the type of controller used within the dwelling, billing information, and other special instructions such as those individuals who are to be called in the event of an alarm. These files may be downloaded to computer 700 from a remote site or may be periodically updated by a user of the computer 700. Moreover, modem 702 may, in the preferred embodiment of this invention, be a conventional low-speed modem since computer 700 is adapted to provide artificial breaks within the modulated data thereby "artificially" modulating the data in a manner which will allow system 420 to be used with a higher speed modem employed by controller 24.

Figure 27:
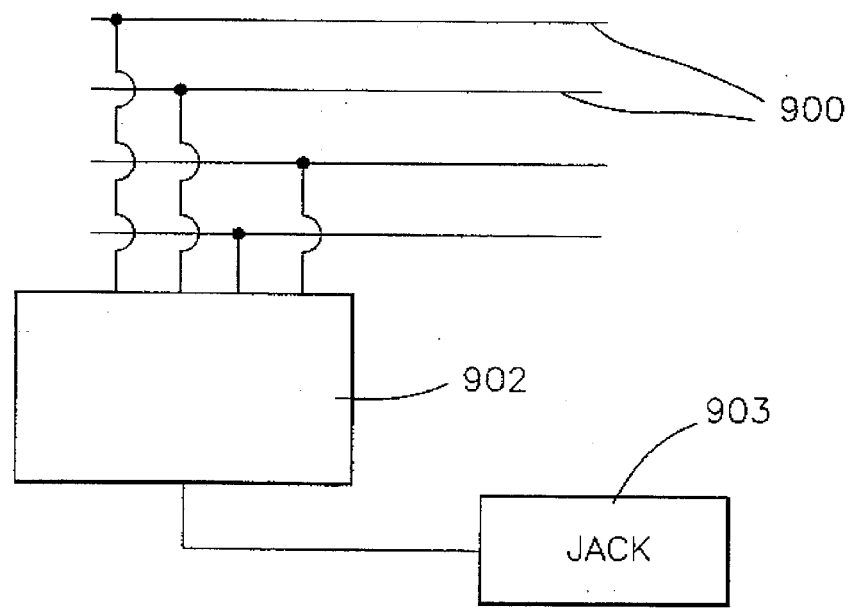
FIG. 27 is a block diagram of a telephone jack interface assembly employed by the security system of this invention.

As shown best in FIG. 27, system 10 may also include a plurality of relays 902 which are adapted to be coupled to the conventional yellow and black wires of a typical telephone line. Each relay 902 is coupled to a unique telephone jack 903 and is adapted to selectively disconnect jack 903 from the conventional tip and ring telephone line portions upon a signal from console 24. Such signal, from console 24 may be placed on the yellow and black wires or transmitted to relay 902 through any desired medium. In this manner, telephone interruptions of a security message, placed on the telephone line 900, is minimized.

Figure 28:
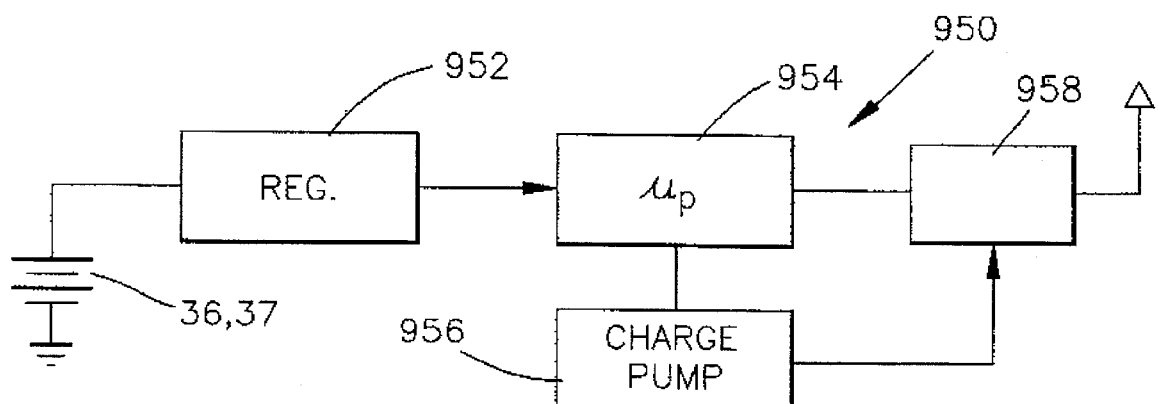
FIG. 28 is a charge pump assembly employed by the security system of this invention.

Moreover, as shown in FIG. 28, each transmitting element 950 of system 10 includes a regulator 952 coupled to a source of electrical power 36, 37 and providing a regulated power input to microprocessor 954. Moreover, each transmitting element 950 (as shown best in FIG. 28) further includes a conventional charge pump 956 coupled to the power port of microprocessor 954 and to antenna and radio frequency transmitting portion 958. In this manner, a lower voltage is needed from battery 36, 37 to operate thereby increasing the operational voltage window and allowing element 950 to operate for a longer period of time with battery 36, 37.

It is to be understood that the invention is not limited to the exact construction or method illustrated and described above, but that various changes and modifications may be made without departing from the spirit and scope of the invention as set forth in the following claims.

I claim:

1. A home security system comprising:

a plurality of alarm elements;

a central console including a microprocessor in wireless communication with said plurality of alarm elements and effective to receive a signal from said alarm elements;

an automobile including an alarm system in wireless communication with said central console's microprocessor and effective to activate certain of said plurality of alarm elements when said automobile's alarm system is in close proximity to said home security system and when the automobile is started;

said microprocessor being connected to a tri-state analog to digital convertor, said tri-state analog to digital convertor including a plurality of resistors whose resistance values cooperatively determined an accuracy of analog to digital conversion with respect to the received signal transmitted from said alarm elements.

* * * * *